(12) United States Patent
Bodiya

(10) Patent No.: US 12,007,296 B2
(45) Date of Patent: Jun. 11, 2024

(54) SYSTEMS AND METHODS FOR TESTING GRATINGS

(71) Applicant: Google LLC, Mountain View, CA (US)

(72) Inventor: Timothy Bodiya, Shanghai (CN)

(73) Assignee: Google LLC, Mountain View, CA (US)

( * ) Notice: Subject to any disclaimer, the term of this patent is extended or adjusted under 35 U.S.C. 154(b) by 526 days.

(21) Appl. No.: 17/304,952

(22) Filed: Jun. 29, 2021

(65) Prior Publication Data

US 2022/0412840 A1    Dec. 29, 2022

(51) Int. Cl.
*G01M 11/02* (2006.01)
*G01M 11/00* (2006.01)

(52) U.S. Cl.
CPC .... *G01M 11/0228* (2013.01); *G01M 11/0207* (2013.01); *G01M 11/35* (2013.01)

(58) Field of Classification Search
CPC ............. G01M 11/35; G01M 11/0207; G01M 11/0228
See application file for complete search history.

(56) References Cited

FOREIGN PATENT DOCUMENTS

CN    201463922 U    5/2010
CN    101943865 B    10/2012

OTHER PUBLICATIONS

Zhu, et al., "Sensing and Demodulation of Special Long-Period Fiber Gratings Induced By Scanning CO2 Laser Pulses", Hindawi Publishing Corporation, Journal of Sensors, vol. 2012, Article ID 539095, 2012, 18 pages.

*Primary Examiner* — Tarifur R Chowdhury
*Assistant Examiner* — Amanda Merlino
(74) *Attorney, Agent, or Firm* — Brake Hughes Bellermann LLP

(57) ABSTRACT

Optical gratings, such as those used in waveguide displays, may have large aspect ratios. For example, a grating characteristic (e.g., period, feature size, etc.) can be much smaller than the grating area. Variations in the grating characteristic over the grating area may appear like a secondary grating having a long grating period superimposed on a primary grating for which the optical grating was designed. Because variations responsible for the secondary grating occur over a long distance relative to the primary grating period, it may be difficult to locate and characterize these variations with testing methods designed for shorter distances. The present disclosure presents systems and methods to detect and characterize the secondary gratings quickly and efficiently.

20 Claims, 8 Drawing Sheets

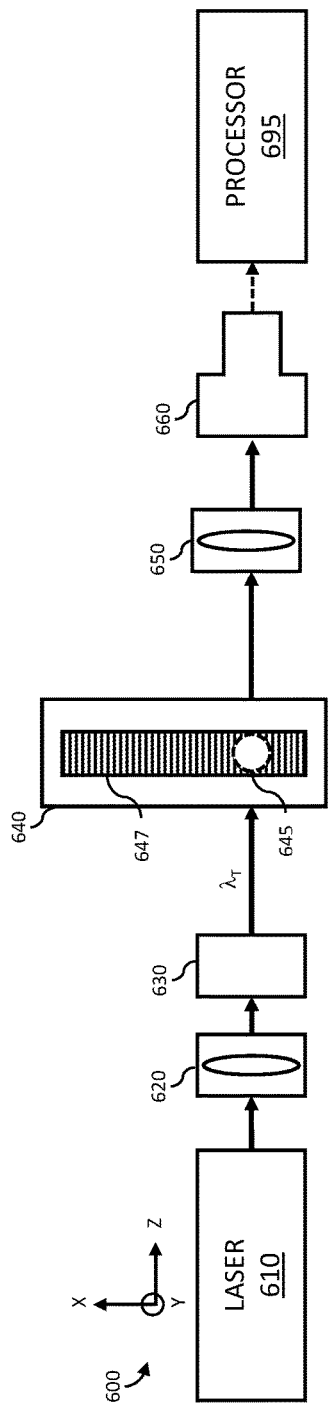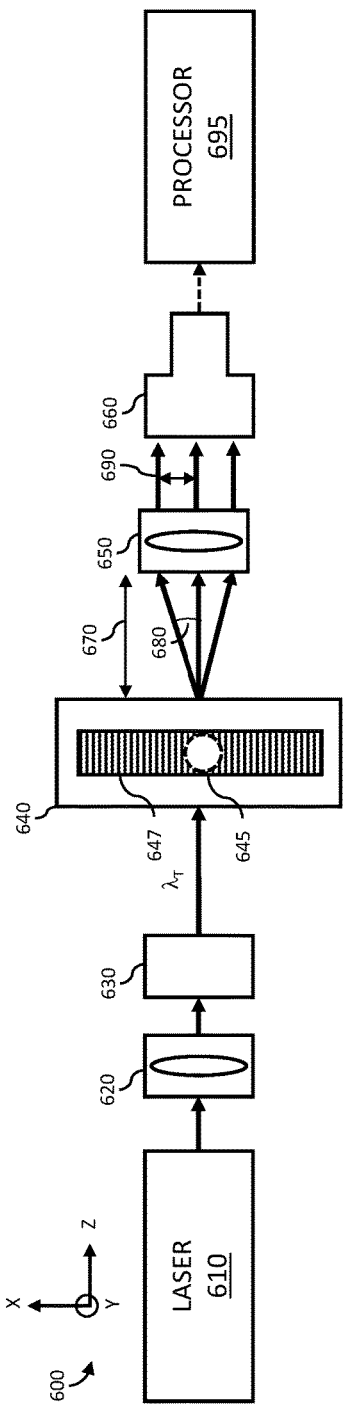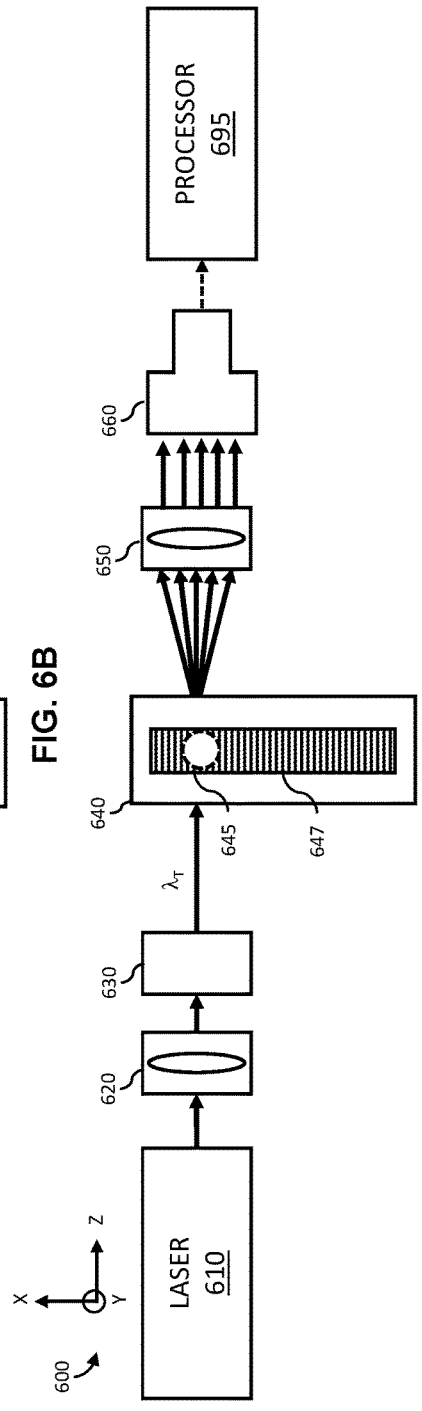

SYSTEMS AND METHODS FOR TESTING GRATINGS

FIELD OF THE DISCLOSURE

The present disclosure relates to optical gratings and more specifically to systems and methods for characterizing deviations from an ideal grating that occur spatially over an area that is large in comparison to a period of the grating.

BACKGROUND

Optical gratings may be used to direct and manipulate light in an imaging system. For example, gratings may be used in a waveguide display to guide and project images from a display to an eye of the user. The user may view artifacts in the images from the display when any or all of these gratings deviate from their designed specifications.

SUMMARY

In at least one aspect, the present disclosure generally describes a method for testing a grating. The method includes directing light from a laser to a first test area on the grating and capturing a grating image based on the light passing through the first test area. The method further includes analyzing the grating image to measure diffraction from a secondary grating and to determine characteristics of the secondary grating from the diffraction when the measured diffraction is nonzero. The secondary grating can result from a defect of a primary grating. The method further includes directing the light to a second test area, capturing a grating image from the second test area, and analyzing the grating image corresponding to the second test area to characterize the defect of the primary grating and/or system (e.g., substrate, coatings).

In another aspect, the present disclosure generally describes a system for testing a grating. The system includes a substrate, a laser, a camera, and a processor. The substrate of the system includes a primary grating in a primary grating area. The laser of the system is configured to project light at a test wavelength, which is not diffracted by the primary grating, to a test area within the primary grating area. The camera of the system is configured to capture a grating image of the light after the light passes through the test area. The processor of the system is configured by software instructions to detect, in the grating image, diffracted orders, which correspond to diffraction from a secondary grating that has a secondary grating period that is larger than a primary grating period. The processor is further configured by software instructions to analyze the diffracted orders to determine characteristics of the secondary grating.

In another aspect, the present disclosure generally describes a method for testing a waveguide display. The method includes sequentially directing a light from a laser to multiple different test areas on a primary grating of the waveguide display. The directed light is at a test wavelength that is larger (i.e., longer) than a primary grating period of the primary grating so that the light is not diffracted by the primary grating. The method further includes sequentially capturing grating images of the light after the light passes through each of the multiple different test areas. The method further includes detecting diffracted orders in one or more of the captured grating images. The detected diffracted orders correspond to a secondary grating. Accordingly, the method further includes analyzing the diffracted orders to determine a characteristic of the secondary grating in each test area corresponding to each of the one or more grating images that include diffracted orders.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIGS. 6A-6C illustrate a system for testing a grating according to possible implementations of the present disclosure.

The components in the drawings are not necessarily to scale relative to each other. Like reference numerals designate corresponding parts throughout the several views.

DETAILED DESCRIPTION

Figure 1:
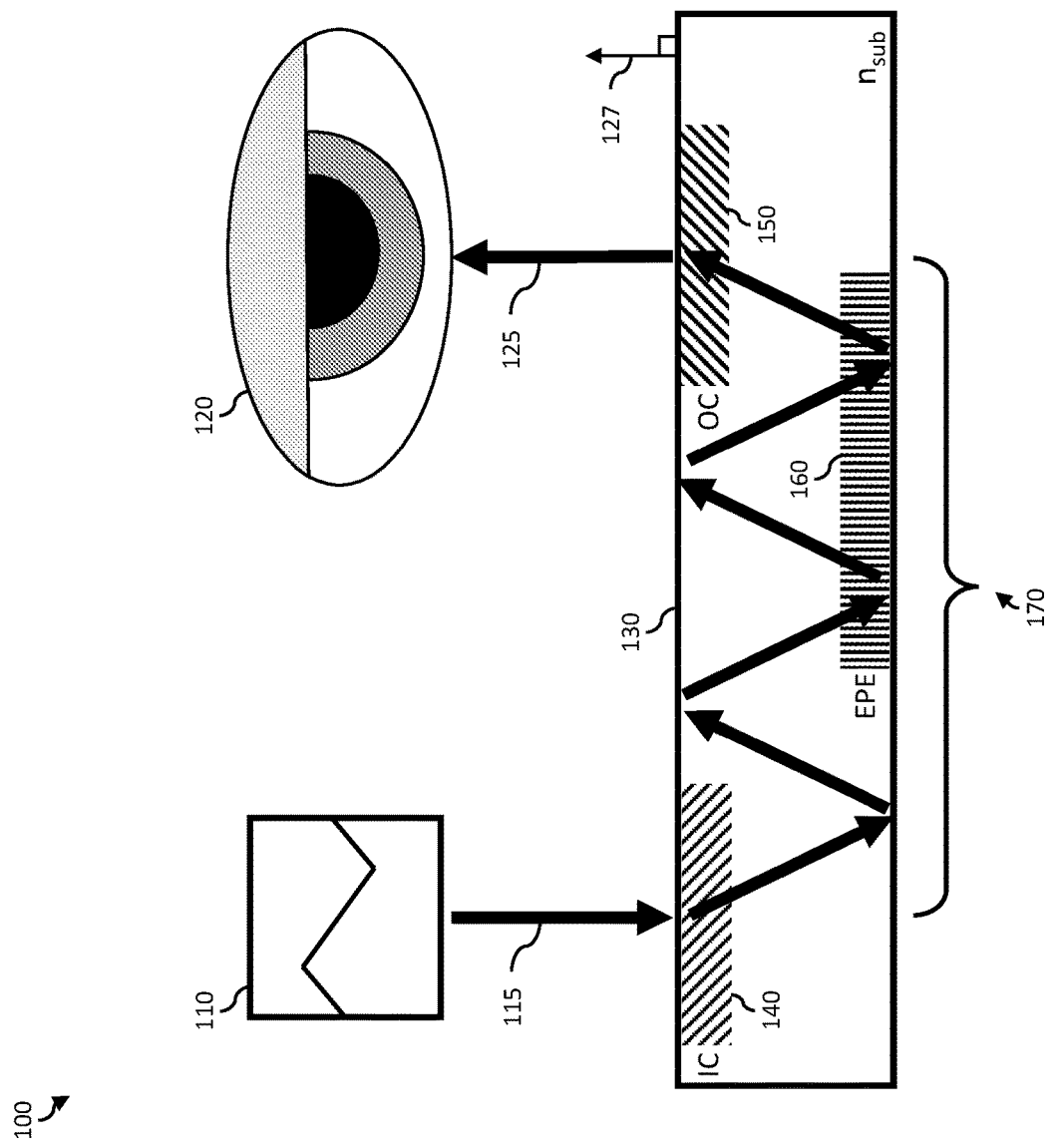
FIG. 1 graphically illustrates a waveguide display according to a possible implementation of the present disclosure.

The present disclosure describes methods and systems to test optical gratings (i.e., gratings). Gratings are spatially periodic structures that can diffract light when the spatial wavelength of the periodic structure is on the order of the optical wavelength of the light. For example, the wavelength-dependent diffraction can be used to direct light of certain wavelengths into certain directions, which can have use in a variety of applications (e.g., imaging, spectroscopy, etc.). A grating may reflect diffracted light (i.e., reflective grating) or may transmit diffracted light (i.e., transmission grating). A grating may be formed in various ways. A substrate may be imprinted to form the grating. Material may be added (i.e., deposited) or subtracted (e.g., etched) to/from a substrate to form the grating (e.g., blazed gratings). The optical properties (e.g., index of refraction) of a substrate or coating (e.g., photopolymer film) can be changed by exposure to light to form the grating (e.g., holographic gratings). While the technology disclosed may be used for all of the gratings mentioned above, a particular application (i.e., waveguide display) will be described in detail. While the particular application will help to explain the disclosed methods and systems and will place them in the context of a particularly useful example, the disclosed technology may be used in other applications (e.g., variants of the disclosed waveguide display) and applied more broadly to gratings in general.

Gratings may be included in a waveguide display for a heads-up display, such as used in an augmented-reality (AR) device or virtual-reality (VR) device. The waveguide display is configured to project images from a display to an eye of the user. For example, AR glasses (i.e., smart glasses) may utilize a waveguide display that includes an in-coupling grating (i.e., IC grating) to couple light from a display into a waveguide (e.g., glass plate) where it can be guided by total internal reflection (i.e., TIR) along a dimension of the waveguide until it interacts with an out-coupling grating (i.e., OC grating), which is configured to couple the light out of the waveguide and into free space so that it can be focused by an eye of the user for viewing. In some implementations, the waveguide display further includes an exit pupil expander grating (i.e., EPE grating) positioned between the IC grating and the OC grating that is configured to provide optical magnification and/or chromatic adjustment to the guided light.

Gratings for the waveguide display can include a spatially periodic index of refraction (i.e., spatially varying index). The spatially varying index may be generated by material variations (e.g., cross-linking) and/or physical variations (e.g., thickness) in a film disposed on a surface of the waveguide or in the waveguide itself. For example, the spatially varying index may be formed in a photo-reactive film using holography (i.e., holographic gratings). Alternatively, the spatially varying index may be generated by fabricating thickness variations in the film or the waveguide. The thickness variations may include adding or removing material to/from the film or the waveguide (e.g., subtractive-manufactured surface-relief gratings, nano-lithographic (printed) gratings). The spatially varying index may be discrete or continuous and can be described, at least in part, by a grating period, a fill factor, a feature size, and/or a feature shape.

While the present disclosure is not limited to any particular grating implementation, a periodic binary grating (i.e., binary grating) is described to illustrate certain principles. The binary grating may include an index that alternates between two index values over a grating period. A grating period of the binary grating can correspond to a length required to transition between the two index values. A fill factor of the binary grating can correspond to a percentage of the grating period designated for one of two index values. A feature size of the binary grating can correspond to a dimension of one of the two index values over a grating period.

Gratings for waveguide displays may have large aspect ratios. For example, a grating period ($\Lambda$) may be less than 500 nanometers (nm), such as in a range from 100 nm to 400 nm (i.e., 100 nm$\leq\Lambda\leq$400 nm) and a feature size may be in a range of 5 nm to 300 nm (e.g., 15 nm), while the grating itself may extend over a much larger area. For example, each side of a grating can have a length in a range of 1 centimeter (cm) to 3 cm.

It may be difficult to produce accurate grating parameters over the entire area of a grating (i.e., grating area) using practical fabrication and/or replication techniques. For example, a variation in a grating period, a grating fill factor, a grating feature size, a grating feature shape, a grating index, or other characteristic of a grating may exist over a length of the grating. The variation may result in artifacts in the images projected by a waveguide display. For example, the variation may generate smeared or duplicative (i.e., ghost) versions of the displayed images when viewed by the eye of a user. While the artifacts themselves are indicative of a variation in the grating, it may be difficult to easily determine how much variation is present, how many variations are present, and/or the location (or locations) of the variation (or variations).

Inspecting gratings may be limited to small scale visual inspections using microscopy, such as using a scanning electron microscope (SEM) or an atomic force microscope (AFM). While these techniques can characterize a grating at a scale comparable to the period of the grating (e.g., scale $\leq 5\Lambda$), characterizing a large scale variation (e.g., scale $>100\Lambda$) may be impractical because of a time necessary to examine a large area (e.g., an entire grating) and/or because of problems related to stitching together local regions of examination. The present disclosure describes systems and methods to solve this technical problem by characterizing variations in a grating quickly and efficiently so that a large area of the grating (e.g., the entire grating) may be analyzed on a routine basis. The disclosed solution may have the technical effect of providing a means for inspecting gratings in a production environment so that defects may be quickly discovered and so that the proper mitigation steps may be taken.

FIG. 1 graphically illustrates a waveguide display system (i.e., system) according to a possible implementation of the present disclosure. The system 100 includes a display 110 that is configured to generate images (e.g., text, video, photos, graphics, etc.) for display to a user. The display 110 may be an electronic display, such as an organic light emitting diode (OLED) display. The system further includes a waveguide 130 that can be configured to receive display light 115 from the display 110. The waveguide 130 can be further configured to guide the display light 115 along a guided portion 170 of the waveguide based on total internal reflection. Accordingly, the waveguide 130 may be a material (e.g., glass) having an index of refraction (e.g., 1.5-2.7) and a dimension (e.g., 150 µm$\leq$thickness$\leq$10 mm) suitable for total internal reflection of visible wavelengths (e.g., 400 nm$\leq\lambda_o\leq$700 nm) and/or near infra-red wavelengths (e.g., 750 nm$\leq\lambda_o\leq$900 nm). The waveguide 130 can be further configured to output projected light 125 to an eye 120 of a user. Accordingly, the waveguide 130 may be positioned in front of the eye 120 of the user and may be transparent at the visible wavelengths so that the user can see images from the display 110 superimposed on the user's view through the waveguide 130.

The waveguide 130 may utilize one or more optical gratings (i.e., gratings) to achieve the function described above. Each of the gratings may exist over a grating area in the waveguide. The gratings may be configured to redirect light along certain angles. For example, the waveguide 130 may include an IC grating 140 to redirect the display light 115 from a first angle (e.g., aligned with a surface-normal vector 127) to a second angle that is greater than a critical angle for total internal reflection at an interface between the waveguide 130 and the environment (e.g., air). The waveguide 130 may further include an EPE grating 160 disposed in the guided portion 170 of the waveguide 130. The EPE grating 160 may be configured to process the light to make viewing the images easier. For example, the EPE grating may be configured to expand the exit pupil of the waveguide 130 so that the display images can be viewed over a range of viewing angles of the eye 120. The waveguide 130 may further include an OC grating 150 configured to redirect the guided light from the second angle greater than the critical angle for TIR to a third angle that is less than the critical angle for TIR so that the projected light 125 exits the waveguide 130. For example, the projected light exiting the waveguide may be normal to a surface of the waveguide 130 (i.e., aligned with a surface-normal vector 127) and in a direction towards an eye 120 of the user so that when focused by the eye 120 an image of the display is focused on the retina of the user. When there are no defects (e.g., variations in grating period and/or feature size) in the gratings of the waveguide 130, the focused image can closely match the displayed image. In other words, artifacts in any of the gratings can reduce an imaging quality (e.g., resolution) of the system 100.

While the system 100 of FIG. 1 may be configured for monochromatic light, it should be understood that the principles described for this monochromatic system may be adapted to accommodate color (i.e., RGB) light. For example, one or more channels (i.e., red (R), green (G), blue (B)) of light from the display 110 may be processed (e.g., routed) through one or more waveguides for focus by the eye 120 of the user.

Figure 2:
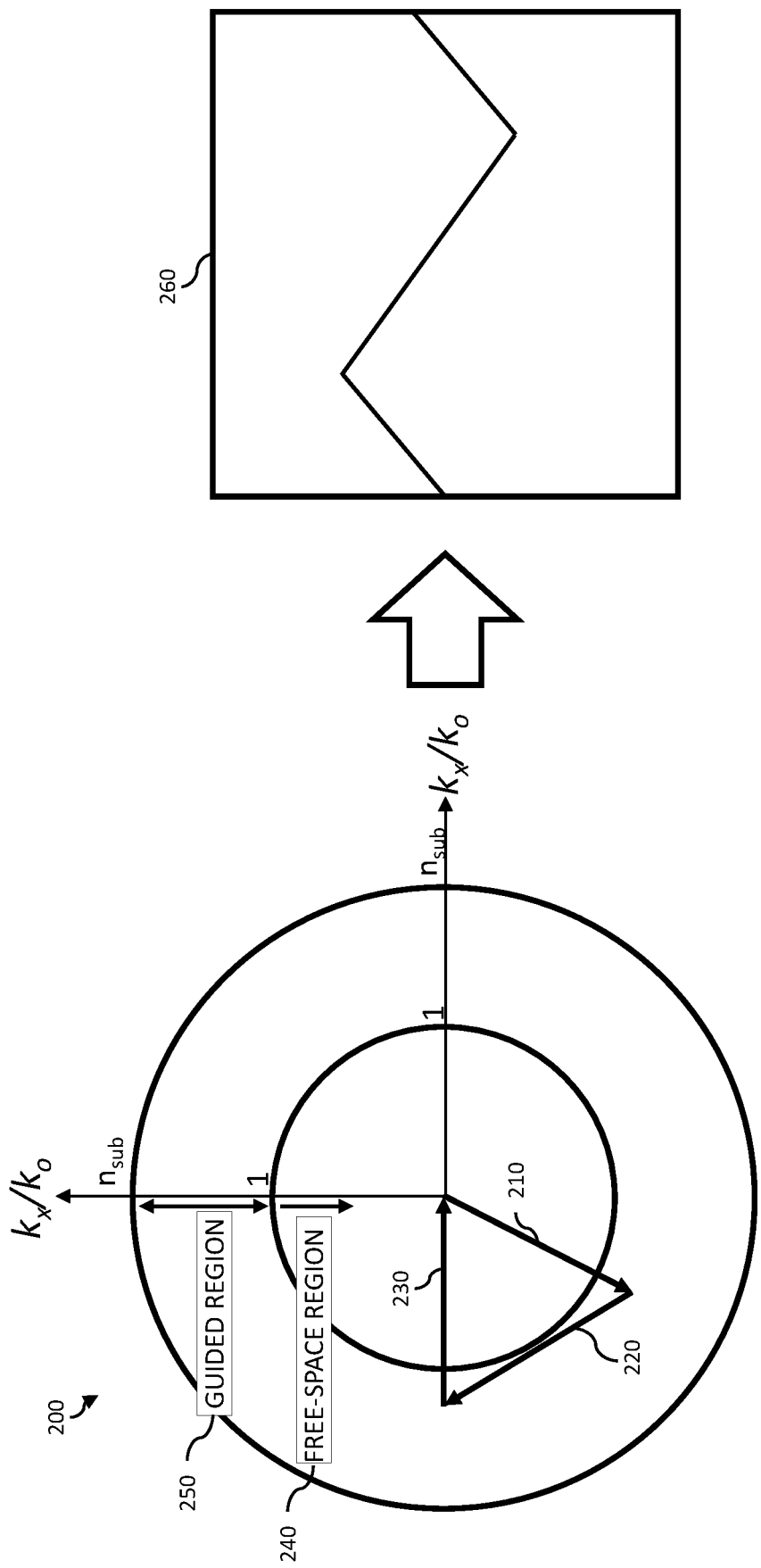
FIG. 2 is a k-space diagram illustrating possible effects of the gratings in the waveguide display of FIG. 1.

FIG. 2 is a k-space diagram 200 illustrating the effects of the gratings on the light propagating through the waveguide display of FIG. 1. The diagram has two dimensions that correspond to a plane (x, y) of the waveguide 130. The diagram includes multiple k-vectors. Each k-vector illustrates the redirection of light through a portion of the waveguide 130. The directions of each k-vector are different due to diffraction of the light by the gratings. For example, a first k-vector 210 may correspond to light entering the waveguide 130, a second k-vector 220 may correspond to light propagating within the waveguide 130 (i.e., guided by TIR), and a third k-vector 230 may correspond to light exiting the waveguide 130.

The k-space diagram 200 includes several regions defined by constant radius k-values. A free-space region 240 is an area of the k-space diagram 200 within a constant radius circle defined by a magnitude of k that is equal to a free-space k-value ($k_o$). In other words, the free-space region is bordered by a circle centered at the origin of k-space and having a radius of 1. When a k-vector is in the free-space region 240, the light is propagating in free space, such as from the display 110 or to the eye 120.

A guided region 250 is an area of the k-space diagram 200 outside of the free-space region 240 and within a constant radius circuit defined by a normalized k-value that is equal to the index of refraction of the waveguide (i.e., substrate) material (i.e., $n_{sub}$). In other words, the guided region 250 is bounded on one side by the free-space region 240 and bounded on the other side by a circle centered at the origin of k-space and having a radius of $n_{sub}$ (e.g., 1.5 for some glass). When a k-vector is in the guided region 250, the light is guided by the waveguide. In other words, the light experiences total internal reflection within the waveguide 130.

The first k-vector 210 corresponding to the IC grating 140, the second k-vector 220 corresponding to the EPE grating 160, and the third k-vector 230 corresponding to the OC grating 150, illustrate routing of the image from the display to an output of the waveguide without further diffraction that could be caused by a secondary grating formed by a variation in one or more of the gratings. Accordingly, an image 260 of the display 110 (e.g., formed by the eye of the user) can have no (e.g., zero) imperfections (e.g., smearing, ghosting, chromatic separation).

A secondary grating is a grating superimposed on a designed (i.e., ideal) grating (i.e., a primary grating) that results from imperfections in a grating generation process or a grating replication process. As described, the variations may be variations in material (e.g., index, absorption, etc.) and/or structural properties (e.g., size, shape, etc.) of the grating that affect the uniformity of the grating over a scale that is longer than a primary grating period of the primary grating. For example, the secondary grating may be a variation to the primary grating over a length that is more than 100 times the length of a period of the primary grating (i.e., primary grating period). In other words, a secondary grating period ($\Lambda_S$) may be larger than a primary grating period ($\Lambda_p$).

Light interacting with the gratings can be described by the grating equation (1), shown below.

$$\frac{\vec{k_d}}{k_o} - \frac{\vec{k_i}}{k_o} = \lambda_o \left[ \frac{S \cdot \hat{k}_S}{\Lambda_S} + \frac{P \cdot \hat{k}_P}{\Lambda_P} \right] \quad (1)$$

In the grating equation (1), the normalized k-vector, $$\frac{\vec{k_i}}{k_o}$$

is the k-vector of a beam of light incident to the gratings (i.e., incident light, incident beam) and $$\frac{\vec{k_d}}{k_o}$$

is the normalized k-vector a beam of light diffracted from the gratings (i.e., diffracted light, diffracted beam). While not noted, the incident light and the diffracted light may be in a polarization that is parallel to a plane formed by the k-vector and a surface-normal vector 127 of the gratings. In other words, the incident light may be polarized in plane with the surface-normal vector of the substrate.

In the grating equation (1), $\lambda_o$ is the wavelength of the incident light (i.e., the incident wavelength). The wavelength ($\lambda_o$) is multiplied to the k-space, vector-sum of $$\frac{S \cdot \hat{k}_S}{\Lambda_S} + \frac{P \cdot \hat{k}_P}{\Lambda_P}.$$

In the term $$\frac{S \cdot \hat{k}_S}{\Lambda_S},$$

S is the diffracted order of the secondary grating, $\Lambda_S$ is the period of the secondary grating and $\hat{k}_S$ is the k-space unit-vector (i.e., direction) of the secondary grating. In the term $$\frac{P \cdot \hat{k}_P}{\Lambda_P},$$

P is the diffracted order of the primary grating, $\Lambda_P$ is the period of the primary grating, and $\hat{k}_P$ is the k-space unit vector (i.e., direction) of the primary grating. The directions of the primary grating and the secondary grating may be orthogonal in k-space. The diffracted order of the secondary grating (S) and the diffracted order of the primary grating (P) may positive and negative integers including zero (e.g., ... −3, −2, −1, 0, +1, +2, +3 ...), where a zero order (e.g., S=0) represents no diffraction due to that grating. For example, S=0 at a particular wavelength can correspond to the absence of a secondary grating (i.e., no long-range variation) at the particular wavelength.

The grating equation (1) implies that a single incident beam may produce many orders of diffracted light. For the waveguide display of FIG. 1, it may be desirable for the grating equation to have P=+1 and S=0 so that only light from the primary grating is in free-space region 240 to prevent any secondary orders from being included in the image 260 of the display 110. FIG. 2 illustrates an example of this scenario in k-space and image-space.

Figure 3:
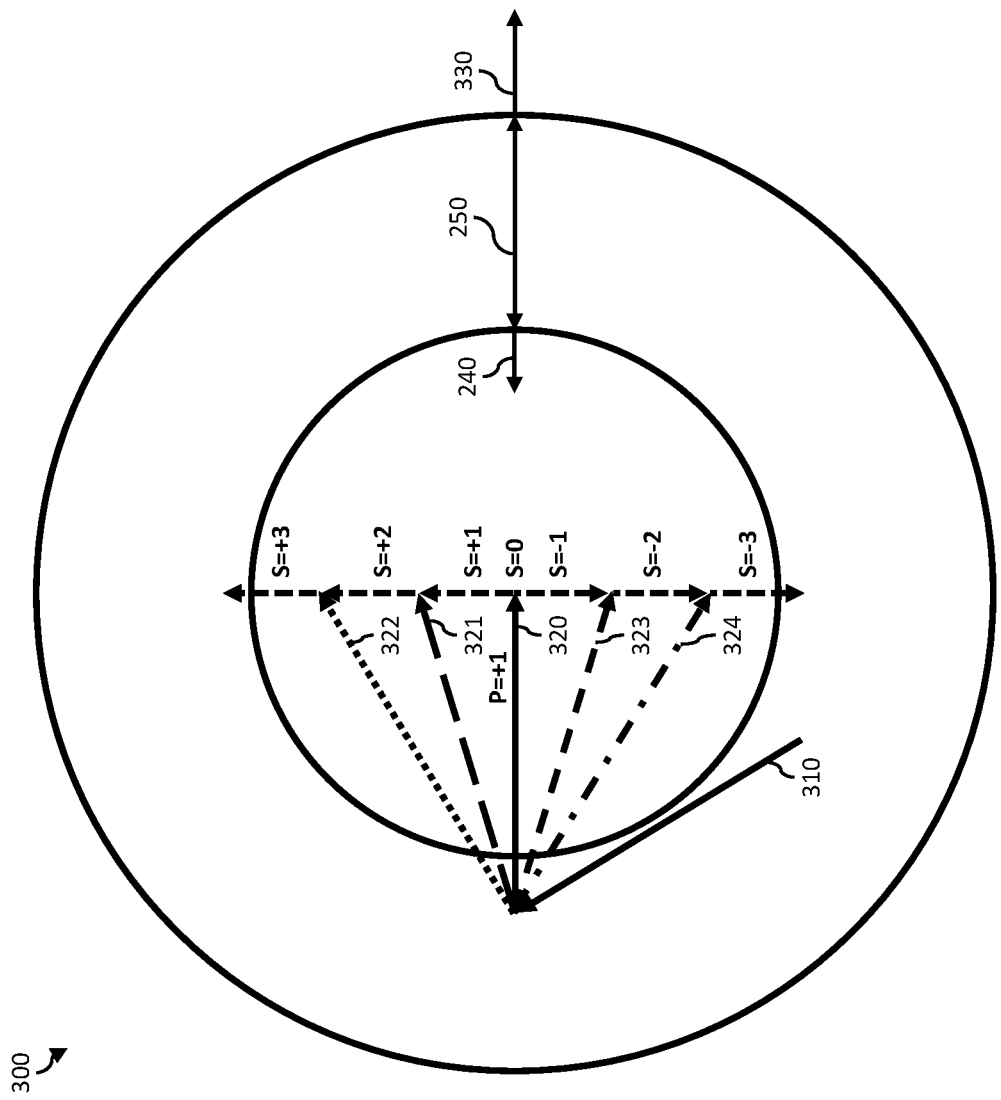
FIG. 3 is a k-space diagram illustrating the effect of variations in a grating in the waveguide display of FIG. 1.

FIG. 3 is a k-space diagram illustrating the effect of variations in a grating of the waveguide display of FIG. 1. In the k-space diagram 300, only k-vectors associated with the OC grating are illustrated. The diagram includes an incident k-vector 310 (i.e., $$\left(\text{i.e. } \frac{\vec{k_i}}{k_o}\right).$$

The incident k-vector is diffracted by the OC grating. In this implementation, the OC grating includes variations (i.e., artifacts) that create a secondary grating. Accordingly, the light is diffracted according to the grating equation 1. While not a requirement, in this implementation the secondary grating is orthogonal to the primary grating. As a result, k-vectors corresponding to the secondary grating may be orthogonal to k-vectors corresponding to the primary grating. k-vectors corresponding to the secondary grating are shorter than k-vectors corresponding to the primary grating because, in this example, the period of the secondary grating ($\Lambda_s$) is larger than the period of the primary grating ($\Lambda_p$) (i.e., $\Lambda_s > \Lambda_p$).

Orders within the free-space region 240 of k-space can be coupled (i.e., can be visible) to the eye 120 of the user. The visible diffracted orders correspond to a P=+1, S=0 k-vector 320 (i.e., diffraction from the primary grating alone), a P=+1, S=+1 k-vector 321, a P=+1, S=+2 k-vector 322, a P=+1, S=−1 k-vector 323, and a P=+1, S=−2 k-vector 324. The P=+1, S=+3 k-vector and the P=+1, S=−3 k-vector shown in FIG. 3 result in light in the guided region 250 so remain in the waveguide and are not visible to the eye of the user. Likewise, other primary grating (i.e., P) orders (0, −1, +2) (not shown) fall outside the free-space region and are not visible to the eye 120 of the user. In other words, a non-propagating region 330 may be the area of k-space outside of the guided region 250. Grating orders in the non-propagating region 330 do not exist. For example, if a wavelength is made much larger than the grating (i.e., the grating is sub-wavelength) it will not diffract from the grating.

Figure 4:
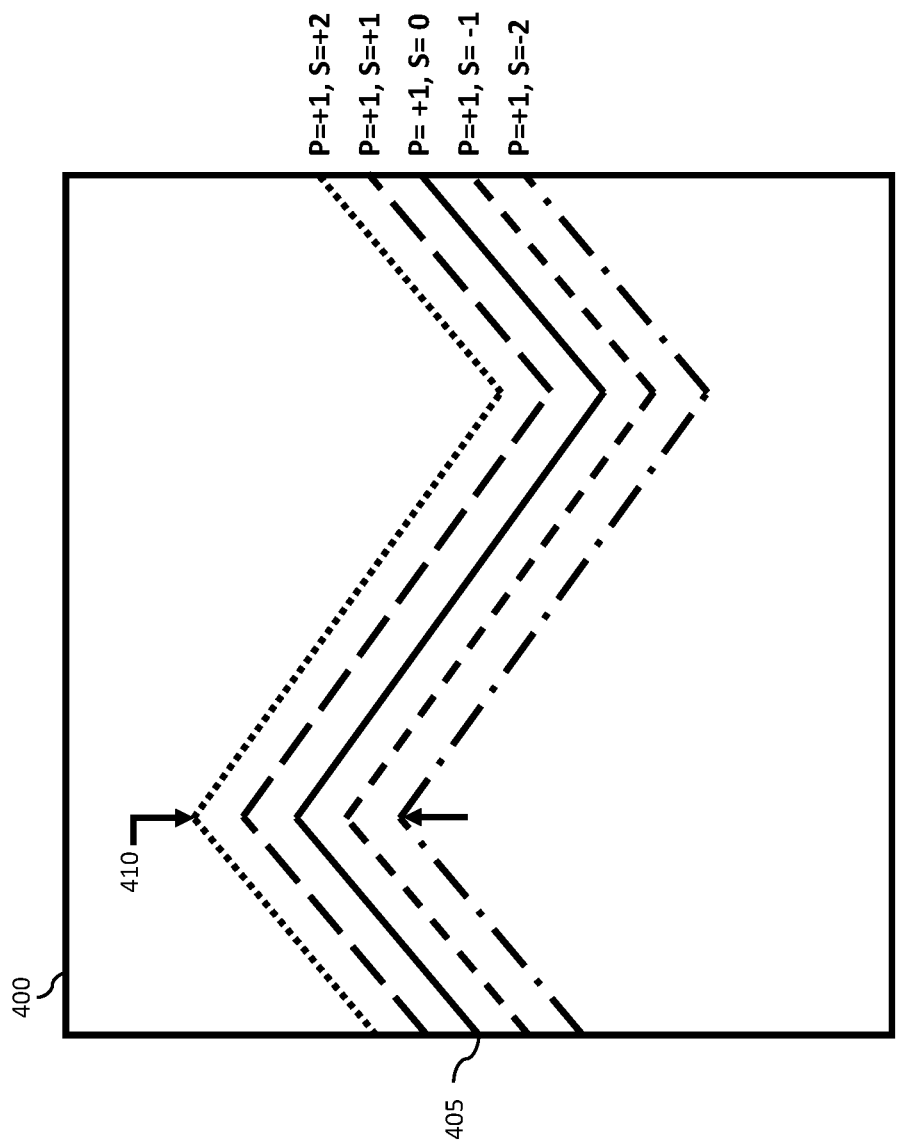
FIG. 4 is an example image corresponding to the k-space diagram of FIG. 3.

FIG. 4 is an image corresponding to the k-space diagram of FIG. 3 according to a possible implementation of the present disclosure. As shown, the image 400 includes ghost images corresponding to the secondary grating are spatially offset from a primary image 405 from the primary grating (i.e., P=+1, S=0). A separation 410 between the ghost images can correspond to a period of the secondary grating ($\Lambda_s$). For example, as the period of the secondary grating increases, a separation 410 between the ghost images may decrease so that the primary image 405 from the primary grating may appear blurred or smeared. The present disclosure describes systems and methods to conveniently identify and characterize a grating having one or more secondary gratings in addition to their primary (i.e., designed) grating.

From the grating equation (1), the momentum shift in k-space (i.e., the redirection in real space) is proportional to the incident wavelength ($\lambda_o$) and as mentioned, the primary grating period is less than the secondary grating period (i.e., $\Lambda_p < \Lambda_s$). By increasing the incident wavelength to a test wavelength ($\lambda_t$) that is much larger than $\Lambda_p$ in a substrate ($n_{sub}$) (e.g., $\lambda_t > 10 n_{sub} \Lambda_p$), the light may no longer be affected (e.g., diffracted) by the grating. In k-space this can correspond to a k-vector associated with the primary grating having a magnitude greater than the free space region (i.e., 1) and greater than the guided region (i.e., $n_{sub}$). While $\lambda_o$ is increased to the test wavelength (i.e., $\lambda_t > X_o$), the test wavelength ($\lambda_t$) may be still smaller than $\Lambda_s$ so that k-vectors associated with orders of secondary grating are within the free space region (i.e., <1) of k-space.

Figure 5:
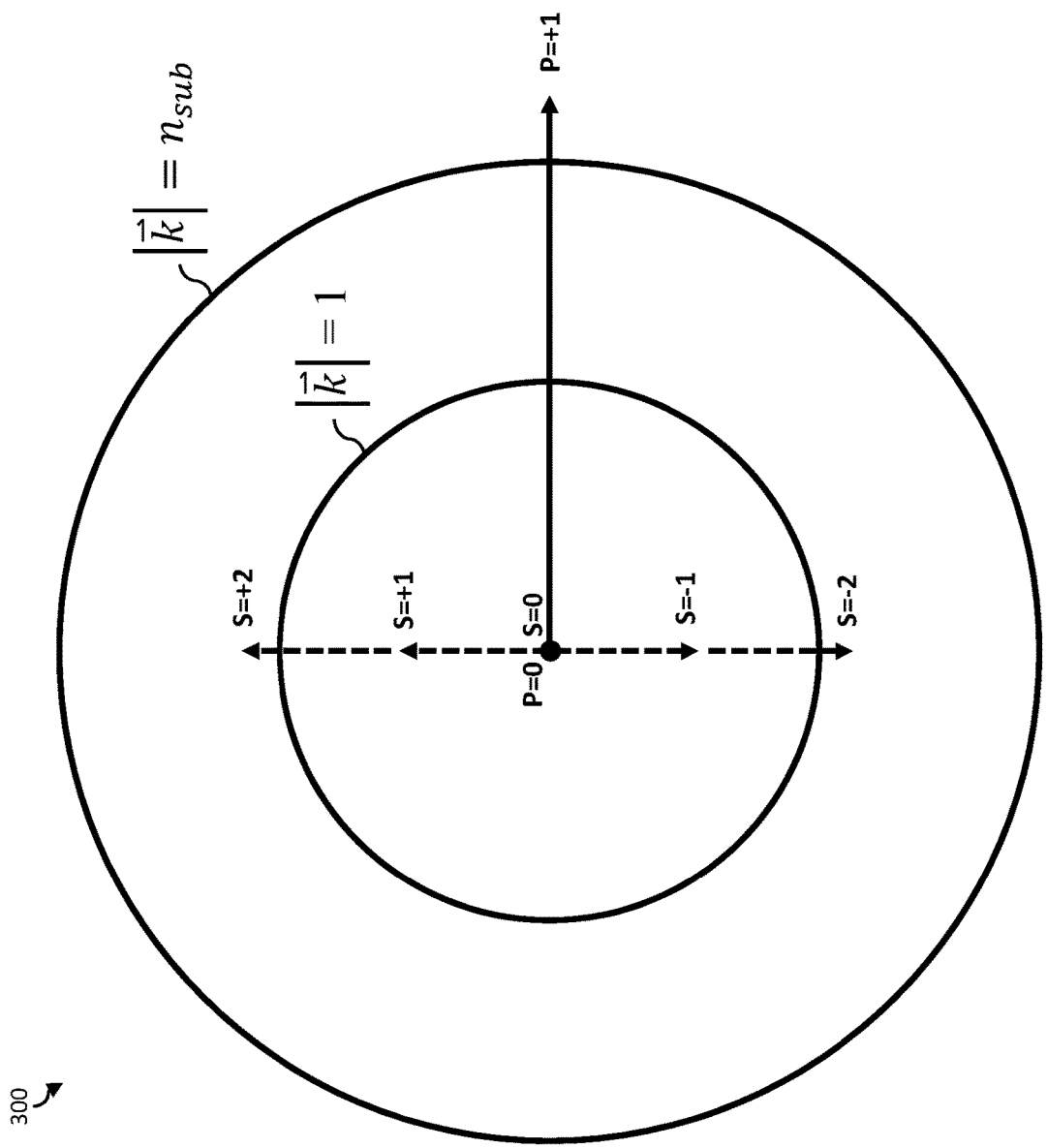
FIG. 5 is a k-space diagram illustrating a test of a grating according to a possible implementation of the present disclosure.

FIG. 5 is a k-space diagram of a test of a grating. In the test, a beam of incident light is projected on the grating at a direction that is normal to the surface of the grating. In k-space, the incident light begins as the center (in the free-space region 240). The incident light is at a test wavelength so that a first diffracted order (P=+1) of the primary grating falls in the non-propagating region. Accordingly, the only order from the primary grating that exists (i.e., are visible) is the P=0 order (i.e., no diffraction from the primary grating). In other words, the primary grating period is sub-wavelength so that the test light is not diffracted by the primary grating. The secondary grating, however, is not sub-wavelength and so diffracts light at the test wavelength into two visible orders (i.e., S=+1 and S=−1) in the free-space region of k-space (i.e., $$\left(\text{i.e., } \frac{|\vec{k}|}{k_0} < 1\right).$$

By analyzing the diffracted light, aspects of the secondary grating may be determined. For example, the visible diffracted light can indicate the presence of a secondary grating. Further, the separation of diffracted orders can indicate a period of the secondary grating (see grating equation (1)) and the orientation of diffracted orders can indicate an orientation of the secondary grating.

A first condition for the test wavelength ($\lambda_t$) to achieve the conditions illustrated in FIG. 5 corresponds to a k-vector for the primary grating light (S=0, P=+1) that has a normalized magnitude greater than the index (i.e., $n_{sub}$) of the waveguide (e.g., the grating substrate). Assuming the test light is at normal incidence and parallel polarization (i.e., $k_i=0$), a first boundary for a range of test wavelength can be derived from the grating equation (1) for S=0, as shown below.

$$\left|\frac{\vec{k_d}}{k_o}\right| = \lambda_t \left[\frac{P}{\Lambda_P}\right] > n_{sub} \quad (2)$$

When P=+1, as shown in FIG. 4, the equation (2) above reduces to $\lambda_t > n_{sub} \cdot \Lambda_p$.

A second condition for the test wavelength ($\lambda_t$) to achieve the conditions illustrated in FIG. 5 corresponds to a k-vectors for the second grating light (e.g., S=+1, P=0) that have normalized magnitude less than one (i.e., in the free-space region). Assuming the test light is at normal incidence and parallel polarization (i.e., $k_i=0$) a second boundary for the range of test wavelength (i.e., test wavelength range) can be derived from the grating equation (1), as shown below.

$$\left|\frac{\vec{k_d}}{k_o}\right| = \lambda_t \left[\frac{S}{\Lambda_S}\right] < 1 \qquad (3)$$

When S=+1, which is at least the order that can be viewed to detect the secondary grating, equation (2) above reduces to $\lambda_t < \Lambda_S$.

Thus, a test wavelength range of the test wavelength for measuring variations (i.e., defects) in a grating are shown in the equation below.

$$n_{sub}\Lambda_P < \lambda_t < \Lambda_S \qquad (4)$$

FIGS. 6A-6C illustrate a grating test system according to possible implementations of the present disclosure. The grating test system (i.e., test system 600) can include a laser 610 configured to generate and project light at the test wavelength ($\lambda_t$). In some implementations, the laser 610 may be tunable to determine a particular test wavelength within the test range described above and/or a maximum wavelength or minimum wavelength of the test range itself (i.e., $n_{sub}\Lambda_P$, $\Lambda_S$). The laser 610 may be conveyed through a transmission medium (e.g., free space, fiber) to a first optical stage 620. The first optical stage 620 may include one or more optical components (e.g., pinhole, lens, mechanical positioners) configured to spatially filter, collimate, shape and/or translate (e.g., x/y translations) light from the laser 610. The test system 600 can further include a second optical stage 630 configured to process the light so that the test conditions described above (e.g., normal incidence, parallel polarization) may be achieved. The second optical stage 630 may include one or more components (e.g., dichroic beam splitter, waveplate) configured to polarize the light from the laser 610. Additionally, or alternatively, the second optical stage 630 may include components and circuitry (e.g., photodetector circuit) for monitoring the intensity of the laser 610. In a possible implementation, the monitored intensity is fed back to the laser to power stabilization, which may be useful for counteracting polarization fluctuations.

The test system 600 may further include a grating under test (GUT 647). The GUT 647 may be a grating in a waveguide 130, such as shown in FIG. 1 or may simply be a substrate including a primary grating in a primary grating area (of the substrate). In the test system 600, the GUT 647 may be mounted in (i.e., affixed to) a grating positioner 640 configured to control the relative position of the GUT 647 so that a test area 645 can be illuminated by the light from the laser. For example, the test positioner may be configured to move the grating in an X-direction or a Y-direction, as shown in FIG. 6A. The test area may have a dimension (e.g., diameter) relative to (e.g., larger than) a secondary grating period ($\Lambda_S$) (e.g., $2\Lambda_S \leq$ test area $\leq 10\Lambda_S$). In other words, the test area 645 (i.e., spot size) can be made large enough to encompass the long-range variation of the primary grating, which behaves optically as a secondary grating.

As discussed, the light from the laser is at a test wavelength ($\lambda_t$) that does not interact (e.g., diffract) with a primary grating but does interact (e.g., diffract) with a secondary grating. By sensing one or more characteristics of the diffraction caused by a secondary grating, defects (i.e., artifacts) in the grating (i.e., primary grating) may be determined. Accordingly, the test system 600 includes devices and components to measure diffraction at various locations on the grating. By analyzing the secondary grating diffraction (e.g., diffracted orders) at the various locations (i.e., test areas, test sites, scan positions, etc.), characteristics of the long-range variation of the primary grating can be determined.

The test system 600 further includes an imaging lens 650 configured to focus the light from the GUT 647 to a camera 660. The imaging lens 650 may be position between the GUT and the camera 660 at a distance 670 from the GUT 647 that is approximately (e.g., ±5%) one focal length (f) so that the light from the imaging lens is focused at focal very large focal length (e.g., infinity). The camera 660 may be an electronic camera (e.g., CCD, CMOS) configured to capture digital images of the light from the imaging lens 650 (i.e., grating images).

The test system 600 may include a processor 695. The camera 660 can be communicatively coupled (e.g., wired, wirelessly, via a memory) to a processor 695. The processor 695 may be configured by software instructions (e.g., retrieved from a non-transitory computer readable medium) to determine positions and/or patterns of light from the grating captured as grating images by the camera 660. The processor 695 may be further configured to determine characteristics of the GUT 647 from these positions and/or patterns. In some implementations, the processor 695 may be further configured to control the laser 610, the camera 660, and/or the grating positioner 640 to automate a grating test process by automatically acquiring grating images from multiple different test areas in sequence as the grating is moved to the multiple different test areas. In other implementations, a controller (not shown) may control the acquisition of grating images from a variety of test areas on the GUT 647.

FIG. 6A illustrates the test system 600 capturing a grating image from the test area 645 in a first position. In the first position, the test area 645 is aligned with a portion of the grating having no secondary grating (i.e., only a primary grating). As discussed previously, the light at the test wavelength ($\lambda_T$) can pass through the primary grating without diffraction. In this condition, the imaging lens 650 and the camera 660 may generate a grating image having a single beam of light.

FIG. 6B illustrates the test system 600 capturing a grating image from the test area 645 in a second position. In the second position, the test area 645 is aligned with a portion of the grating having a secondary grating in addition to the primary grating. As discussed previously, the light at the test wavelength ($\lambda_T$) can pass through the secondary grating with diffraction. In this condition, the imaging lens 650 and the camera 660 may generate a grating image having multiple beams of light separated by a diffraction distance 690 in the image.

FIG. 6C illustrates the test system 600 capturing a grating image from the test area 645 in a third position. In the third position, the test area 645 is aligned with a portion of the grating having a secondary grating in addition to the primary grating. The secondary grating may change over a length of the GUT 647 because it is not controlled (i.e., is based on a variation). In this case, the secondary grating in the third position has a different secondary wavelength than the secondary grating in the second position (e.g., a shorter secondary wavelength, $\Lambda_S$). As discussed previously, the light at the test wavelength ($\lambda_T$) can pass through the secondary grating with diffraction. In this condition, the imaging lens 650 and the camera 660 may generate a grating image having multiple beams of light (i.e., diffracted orders) separated by a diffraction distance 690 in the image and the number and separation of the multiple beams may help determine the secondary wavelength from the test area 645 in the third position.

Figure 7:
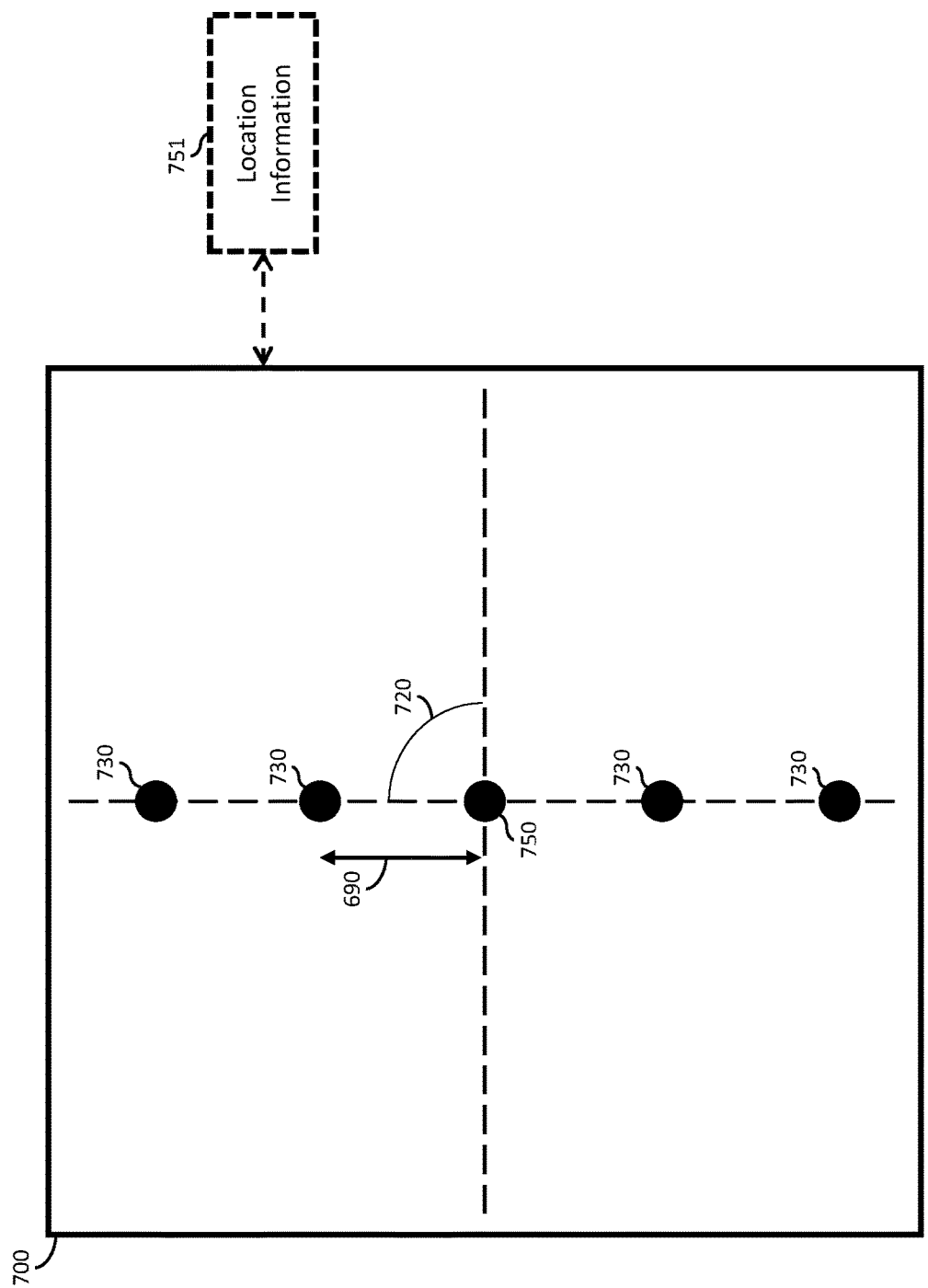
FIG. 7 is an example of a grating image captured by the grating test system of FIG. 6C.

FIG. 7 is an example of a grating image captured by a grating test system according to an implementation of the present disclosure, such as shown in FIG. 6C. The image 700 includes a primary order 750 of light that corresponds to light not diffracted by the GUT 647. The image further includes diffracted orders 730 of light that correspond to light diffracted by a secondary grating of the GUT 647. The image may be processed (e.g., by the processor 695) to determine characteristics of the primary order 750, the diffracted orders 730, and/or the pattern formed by the primary and diffracted orders. For example, measurements (e.g., centroids) of each of the diffracted orders 730 may determine pixel positions of each diffracted order in the image. The pixel positions may be compared (e.g., subtracted) to determine a diffraction distance 690 between the primary order and a diffracted order or between diffracted orders. In the setup described above where the imaging lens is a focal length (f) away from the GUT, the diffraction distance (d) may be related to an angle ($\theta$) of the diffracted order (e.g., $\sin \theta = d/f$) (i.e., diffracted angle 680), and the angle of the diffracted order may relate to the secondary gating wavelength ($\Lambda_S$). In some cases, this information may be useful in determining a variation in the primary grating period or primary grating feature size responsible for generating the secondary grating. Various other measurements may be made based on the pattern of the diffraction. For example, a primary order location and/or an order angle 720 of the orders may relate to a location and/or angle of the secondary grating in the test area.

The analysis of the grating image may take place after each grating image is acquired. For example, when only a detection of the secondary grating is required it may not be necessary to link each grating image with a position (i.e., location information). Rather each grating image may be evaluated as good (e.g., no secondary grating) or bad (secondary grating). Further, in some cases, the grating test process may be concluded whenever a secondary grating is detected.

The analysis of the images may take place after all grating images are acquired. For example, each grating image may be linked to a location on the grating based on location information 751 derived from the grating positioner 640. In some cases, a mechanical step size (i.e., step size) and scan type (e.g., raster scan) may provide location information 751 that can be used to determine a relative position of each grating image. The step size can be selected based on a balance between resolution and speed of the test. For example, when high-resolution testing is desired, the step size may be made smaller than a diameter of the test area 645. Alternatively, when high-speed testing is desired, the step size may be made larger than the diameter of the test area 645. The captured images and their corresponding location information 751 may be stored together in a database on a memory (not shown) coupled to the processor 695.

A spatial map of the secondary gratings (e.g., a spatial map of a secondary grating period) may be created based on a pattern (e.g., grid) corresponding to the test areas of a grating test. This map may be used to map the extent of one or more secondary gratings. This map may also be used to determine how secondary gratings (i.e., variations) change with position, which may be useful in determining long range variations in primary grating period and/or primary grating feature size responsible for the secondary grating.

While some grating image measurement examples have been presented, they may not represent an exhaustive list of the grating image measurements possible and are therefore not intended to be limiting to the exclusion of other obvious variations.

Figure 8:
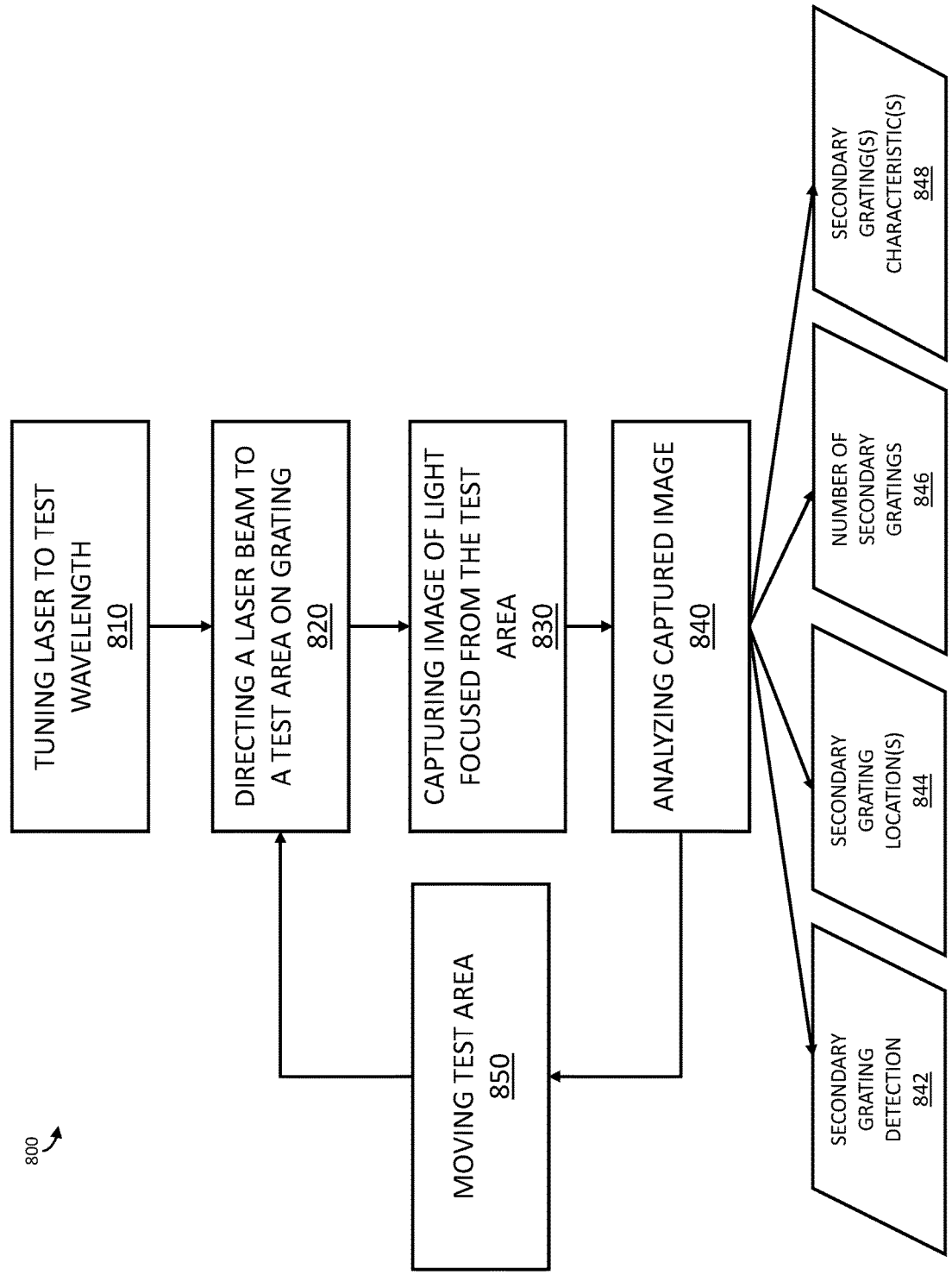
FIG. 8 is a flowchart of a method for testing a grating according to an implementation of the present disclosure.

FIG. 8 is a flowchart of a method for testing a grating according to an implementation of the present disclosure. The method 800 includes tuning 810 a laser to a test wavelength. The test wavelength is a wavelength in a test wavelength range. In some cases, the tuning 810 includes determining a test wavelength.

Determining a test wavelength can include projecting light from the laser at a first wavelength onto the grating so that a diffracted order of the primary grating is present (i.e., visible). Then, tuning (e.g., increasing) the laser wavelength to a test wavelength that is at or below a wavelength at which a diffracted order of the primary grating is not present (i.e., the primary grating no longer interacts with the light). The determination can be done experimentally or via previous knowledge of a primary grating period.

The method 800 further includes directing 820 a laser beam from the laser to a test area on a grating under test and capturing 830 an image (i.e., grating image) of light collected (e.g., focused) from the test area. The method 800 further includes analyzing the collected image to determine information about the grating (e.g., characteristics of the secondary grating). The test area of the grating may then be moved 850 by repositioning the grating, repositioning the laser, or both, and the test process may be repeated for multiple different test areas.

In one example, the analyzing 840 (i.e., the analysis) may determine that a secondary grating exists or does not exist (i.e., secondary grating detection 842) by the presence or absence of diffracted orders in the grating image at a location of the test area.

In another example, the analysis may identify a location of the secondary grating in a substrate, such as a waveguide for a waveguide display (i.e., secondary grating locations 844). For example, when diffracted orders at a test wavelength are determined at a particular location the secondary grating may be located at the particular location. In some implementations, this locating process may be used to map boundaries of an area including the secondary grating.

In another example, a number of secondary gratings may be determined 846. For example, in some implementations multiple secondary gratings may be located over an area occupied by the grating (e.g., over an area of a substrate). The multiple secondary gratings may have the same grating wavelength or different grating wavelengths and may be located in different areas separated by areas having only primary gratings. After the test, the number of secondary gratings may be determined as the number of different areas having secondary gratings determined during an automated scan of the grating.

In another example, some characteristics of the secondary gratings may be determined 848. For example, a secondary grating period may be determined based on the diffracted order spacing in a grating image. In a possible implementation, the secondary grating period may be used to determine a variation in a primary grating period, a primary grating fill factor, and/or a primary grating feature size over a distance that is larger than the primary grating period.

The method for testing a grating may be used to test gratings or systems as part of a production process. For example, a grating of a waveguide for a waveguide display system may be tested. Because the collection of grating images from the grating test may proceed as fast as the grating can be mechanically scanned. The analysis of the grating images may occur during the mechanical scan or after. When the analysis is performed after the mechanical scan, grating images acquired during the scan may be stored in a memory with associated location information 751. The grating testing disclosed may lower cost and time for testing gratings and may provide a means to understand variations that occur on a physically large scale compared to the period of the primary grating.

The disclosed grating tests may generate information that can be used to facilitate other grating tests. For example, locations identified as having secondary gratings may be identified for testing using a different modality, such as microscopy. Microscopy (e.g., SEM, AFM, TEM) tests may be used to determine grating defects in more detail. For example, a follow-up microscopy test may quantify variations in the primary grating period, the primary grating fill factor, and/or the primary grating feature size responsible for the secondary grating (i.e., image artifacts). This approach may advantageously save time compared to scanning an entire grating using microscopy because only areas with detected secondary gratings are scanned using the slower microscopy.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth. Additionally, some implementations may use single crystal diamond, HOYA™ TAFD55-W, or other display waveguide glass types. Further, some implementations may use optical grade plastics.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

What is claimed is:

1. A method for testing a primary grating, comprising:
   directing light from a laser to a first test area on the primary grating,
   wherein a test wavelength of the light is larger than a primary grating period of the primary grating;
   capturing a grating image based on the light passing through the first test area;
   analyzing the grating image to measure diffraction from a secondary grating and to determine characteristics of the secondary grating from the diffraction when the measured diffraction is nonzero, the secondary grating resulting from a defect of the primary grating; and
   repeating the directing, capturing, and analyzing at a second test area on the secondary grating to characterize the defect of the primary grating.

2. The method according to claim 1, wherein the defect of the primary grating is a spatial variation of a characteristic of the primary grating over a distance is more than 100 times larger than the primary grating period.

3. The method according to claim 2, wherein the characteristic is the primary grating period, a primary grating fill factor, a primary grating feature size a primary grating feature shape, or a primary grating index of refraction.

4. The method according to claim 1, further comprising:
tuning the laser to a test wavelength ($\lambda_t$) in a test wavelength range given by: $n_{sub}\Lambda_P < \lambda_t < \Lambda_S$, wherein $n_{sub}$ is an index of refraction of the primary grating, $\Lambda_P$ is the primary grating period, and $\Lambda_S$ is the secondary grating period.

5. The method according to claim 1, wherein the directing the light from the laser to the first test area on the primary grating includes:
projecting the light from the laser so that it is in a direction that is aligned with a surface-normal vector of the primary grating; and
polarizing the light so that it is in a plane with the surface-normal vector of the primary grating.

6. The method according to claim 1, wherein the analyzing the grating image to measure diffraction from the secondary grating and to determine characteristics of the secondary grating from the diffraction includes:
associating location information with the grating image when the measured diffraction is nonzero; and
identifying a secondary grating location based on the location information.

7. The method according to claim 6, further comprising:
scanning the secondary grating location using microscopy to measure variations in grating period, grating feature size, or grating fill factor from corresponding designed values.

8. The method according to claim 1, wherein the analyzing the grating image to measure diffraction from the secondary grating and to determine characteristics of the secondary grating from the diffraction includes:
determining a diffraction distance between a diffracted order and a primary order in the grating image; and
determining a secondary grating period for the grating image based on the diffraction distance.

9. The method according to claim 8, further comprising:
determining an orientation between the diffracted order and the primary order; and
determining an orientation of the secondary grating based on the orientation.

10. A system for testing a primary grating, comprising:
a substrate including a primary grating in the primary grating area;
a laser configured to project light at a test wavelength to a test area within the primary grating area, the test wavelength not diffracted by the primary grating;
a camera configured to capture a grating image of the light after the light passes through the test area; and
a processor configured by software instructions to:
detect diffracted orders in the grating image, the diffracted orders corresponding to diffraction from a secondary grating having a secondary grating period that is larger than a primary grating period, the secondary grating resulting from a defect in the primary grating; and
analyze the diffracted orders to determine a characteristic of the secondary grating to characterize the defect of the primary grating.

11. The system according to claim 10, wherein the secondary grating corresponds to variations in a primary grating characteristic over a distance that is at least 100 times larger than the primary grating period.

12. The system according to claim 11, wherein the characteristic is the primary grating period, a primary grating fill factor, a primary grating feature size, a primary grating feature shape, or a primary grating index of refraction.

13. The system according to claim 10, wherein the processor is further configured to:
control a grating positioner coupled to the substrate to move the test area to multiple different test areas in the primary grating area; and
repeat analyzing the grating image from each of the multiple different test areas to characterize secondary gratings in grating images with diffracted orders.

14. The system according to claim 10, further comprising:
an optical stage configured to direct the light in a direction that is aligned with a surface-normal vector of the substrate; and
a polarizer configured to polarize the light from the laser so that it is in a plane with the surface-normal vector of the substrate.

15. The system according to claim 10, wherein:
the test wavelength ($\lambda_t$) is in a test wavelength range given by: $n_{sub}\Lambda_p < \lambda_t < \Lambda_S$, wherein:
$n_{sub}$ is an index of refraction of the primary grating, $\Lambda_P$ is the primary grating period of the primary grating, and $\Lambda_S$ is the secondary grating period of the secondary grating.

16. The system according to claim 10, further comprising:
an imaging lens having a focal length, the imaging lens positioned between the primary grating and the camera at approximately one focal length away from the primary grating.

17. The system according to claim 10, wherein the substrate is a waveguide of a waveguide display system.

18. A method for testing a waveguide display, comprising:
sequentially directing a light from a laser to multiple different test areas on a primary grating of the waveguide display, the light at a test wavelength that is larger than a primary grating period of the primary grating so that the light is not diffracted by the primary grating;
sequentially capturing grating images of the light after the light passes through each of the multiple different test areas;
detecting diffracted orders in one or more of the grating images, the diffracted orders corresponding to a secondary grating, the secondary grating resulting from a deflect in the primary grating; and
analyzing the diffracted orders to determine a characteristic of the secondary grating in each test area corresponding to each of the one or more grating images that include diffracted orders to characterize the defect of the primary grating.

19. The method according to claim 18, further comprising:
determining location information corresponding to the one or more grating images that include diffracted orders; and
generating a spatial map of the secondary grating based on the location information.

20. The method according to claim 19, further comprising:
determining a change in the secondary grating based on the spatial map.

* * * * *

UNITED STATES PATENT AND TRADEMARK OFFICE
CERTIFICATE OF CORRECTION

PATENT NO. : 12,007,296 B2  
APPLICATION NO. : 17/304952  
DATED : June 11, 2024  
INVENTOR(S) : Bodiya Page 1 of 1

It is certified that error appears in the above-identified patent and that said Letters Patent is hereby corrected as shown below:

In the Claims

In Column 15, Claim 4, Line 2, delete "a" and insert --the--, therefor.

In Column 16, Claim 15, Line 24, delete "s econdary" and insert --secondary--, therefor.

In Column 16, Claim 18, Line 45, delete "deflect" and insert --defect--, therefor.

Signed and Sealed this  
Twenty-seventh Day of August, 2024

Katherine Kelly Vidal  
*Director of the United States Patent and Trademark Office*